United States Patent [19]

Kitaoka

[11] Patent Number: 4,712,929
[45] Date of Patent: Dec. 15, 1987

[54] LABEL PRINTER WITH VARIABLE FORMAT

[75] Inventor: Takashi Kitaoka, Ohtsu, Japan

[73] Assignee: Kabushiki Kaisha Ishida Koki Seisakusho, Kyoto, Japan

[21] Appl. No.: 545,474

[22] Filed: Oct. 26, 1983

[30] Foreign Application Priority Data

Oct. 27, 1982 [JP] Japan ................. 57-188832
Dec. 1, 1982 [JP] Japan ................. 57-211865

[51] Int. Cl.$^4$ ............................................. B41J 11/44
[52] U.S. Cl. ........................................ 400/76; 400/61;
177/2; 177/19; 177/25; 177/30; 346/9;
364/466; 364/518
[58] Field of Search ................ 400/68, 78, 61, 70;
177/2–13, 25, 30, 15, 17, 19; 346/9–12;
364/405, 464, 466, 518, 519

[56] References Cited

U.S. PATENT DOCUMENTS

| | | | |
|---|---|---|---|
| 3,459,271 | 8/1969 | Susor et al. | 177/3 |
| 3,561,551 | 2/1971 | Susor | 177/17 |
| 4,029,161 | 6/1977 | Foster et al. | 177/3 |
| 4,095,738 | 6/1978 | Masuo | 364/405 |
| 4,425,619 | 1/1984 | Matsuda et al. | 364/405 |
| 4,445,795 | 5/1984 | Levine et al. | 400/68 |

FOREIGN PATENT DOCUMENTS

| | | | |
|---|---|---|---|
| 20920 | 1/1981 | European Pat. Off. | 177/2 |
| 57-89981 | 6/1982 | Japan | 400/61 |
| 1516816 | 7/1978 | United Kingdom | |
| 2077970 | 12/1981 | United Kingdom | 400/124 |

Primary Examiner—Edgar S. Burr
Assistant Examiner—David A. Wiecking
Attorney, Agent, or Firm—Staas & Halsey

[57] ABSTRACT

A printer operatively associated with an electronic weigher includes an input unit having numeric keys or format keys, a memory device storing a plurality of programs for controlling positions at which data are to be printed on a label as well as the size of the printed data, each program corresponding to a different label format, reading means for reading out of the memory device a program corresponding to a format designated by operating the keys of the input unit, and a printing mechanism for printing predetermined data on a label at a predetermined position of the label on the basis of the program read out of the memory device. A journal printer for printing out data from a plurality of electronic weighers having different printing formats includes a memory device storing a plurality of different printing formats, weigher discrimination means for discriminating from which of the plurality of electronic weighers data is received, mode discrimination means for discriminating the mode of the data, reading means for reading a printing format out of the memory device in accordance with the results of the discrimination operations performed by these discrimination means, and for delivering the printing format to the printing means.

3 Claims, 10 Drawing Figures

LABEL PRINTER WITH VARIABLE FORMAT

BACKGROUND OF THE INVENTION

This invention relates to a printer, particularly a printer operatively associated with an electronic weigher and capable of having its printing format changed at will.

The conventional drum-type label printer is adapted to print information on a label. The printer prints the name of a product by using a product name stamp, as well as such numerical information as the weight and price of the product, this information being printed out using numerical type. A label printer of this kind does not permit the position or size of the product stamps and numerical type to be changed at will. Even a dot label printer comes equipped with only one printing control program for use with the particular machine, so that only one format is available for the label used.

Items of information printed on a label include, e.g., an indication of the additives contained in the product, a bar code which enables the product code or price to be read by an optical reader, and the effective date of the product. Depending upon the kind of product and the conditions of sale, there are cases where some of these items are unnecessary. In such situations it is required that the type positions be changed for the relevant labels upon taking into consideration the particular information that is to be printed. However, such a change is not possible with the conventional label printer.

An electronic weigher generally is equipped with a label printer for printing such information as the unit price and total price of a product on a label, and a separate journal printer is provided as an accessory for printing out such information as the total of proceeds taken in over a fixed period (such as the day's takings or the takings over a predetermined length of time). Specifically, the journal printer prints out, when necessary, on a sheet of paper for binding in a journal, the proceeds over the fixed period as stored in a memory device or register. There are situations where the printing format of the journal printer differs depending upon the kind of electronic weigher used. For example, the journal printer operatively associated with one variety of electronic weigher may be adapted to print both the product name code and the total proceeds for that product on the same line of paper, whereas a journal printer operatively associated with a different electronic weigher may print the product name code on one line and the total proceeds for that product on the following line. Thus, a journal printer, whose printing format is set to that required by the electronic weigher associated therewith, must be used exclusively for that particular weigher. This means that a journal printer is required for each individual electronic weigher.

SUMMARY OF THE INVENTION

An object of the present invention is to provide a label printer which enables labels of various formats to be used with one and the same label printer.

Another object of the present invention is to provide a journal printer capable of being used with a plurality of electronic weighers each requiring a different printing format.

According to the present invention, the first object is attained by providing a label printer wherein a plurality of programs for controlling the positions at which data are to be printed on a label as well as the size of the printed data are stored in memory beforehand, with each program corresponding to a particular label format. Using an input unit, the operator designates the desired label format, in response to which the corresponding program is read out of the memory. A dot-type printing mechanism is controlled based on the read program. The second object is attained by providing a journal printer having a weigher discrimination function, a data mode discrimination function and a printing format read-out function. A printing format decided by the type of an electronic weigher and the data mode, which are discriminated by the abovementioned discrimination functions, is read out of a memory device so that the data from the discriminated electronic weigher may be printed in the printing format which has been decided.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
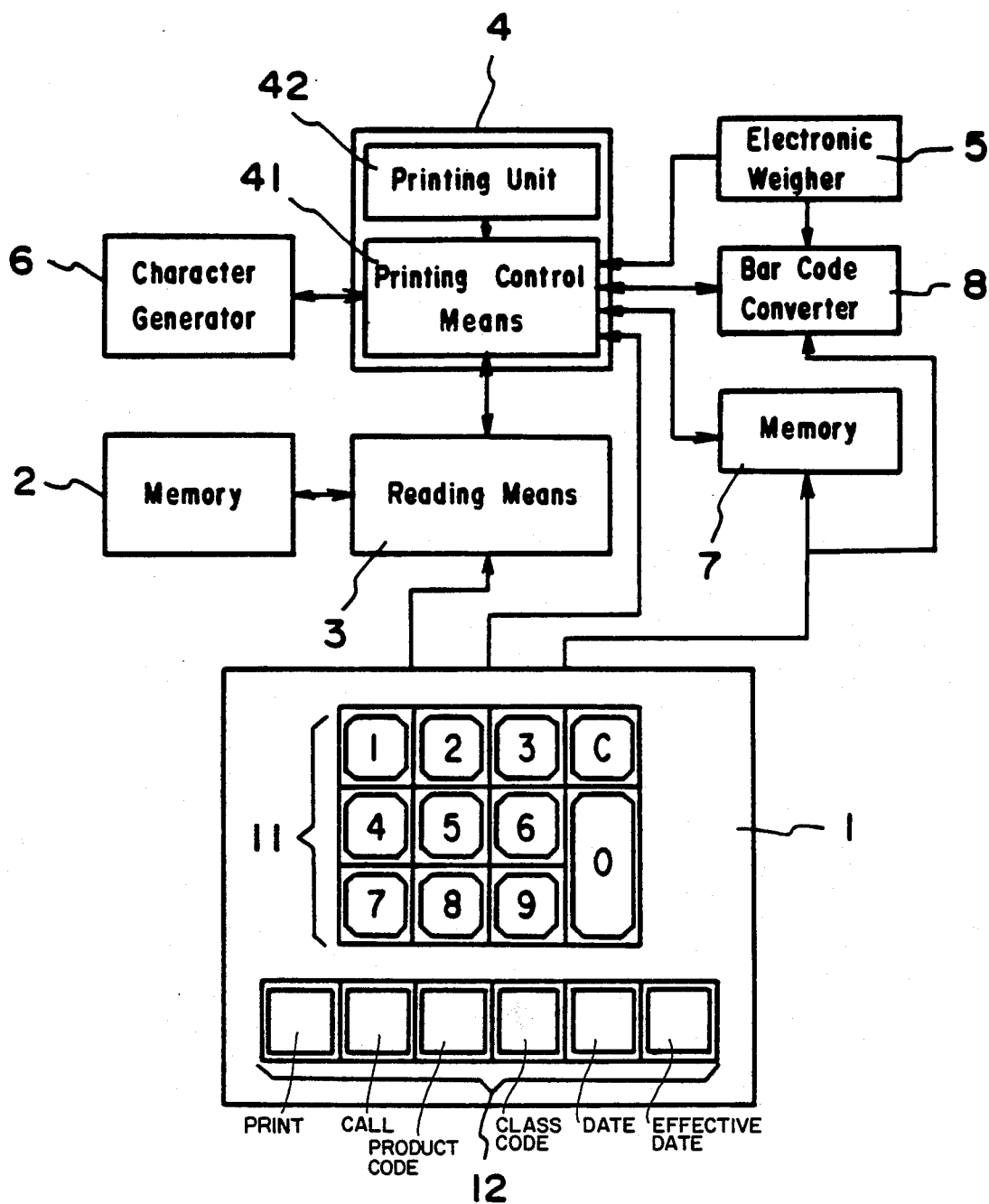
FIG. 1 is block diagram illustrating a label printer according to the present invention operatively associated with an electronic weigher.
Figure 2A:
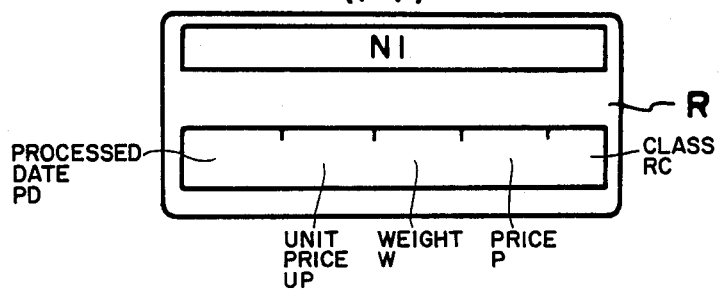
FIG. 2 is a plan view of label formats.
Figure 2A:
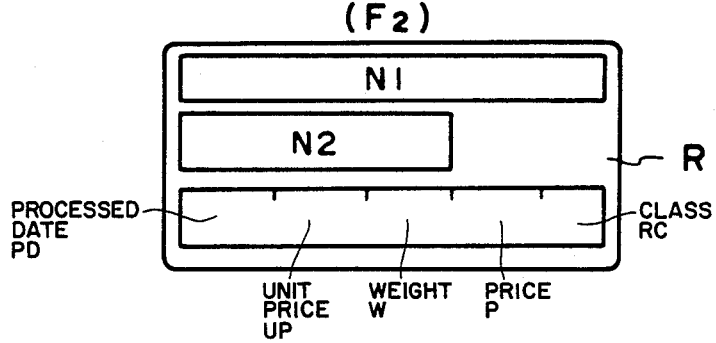
Figure 2A:
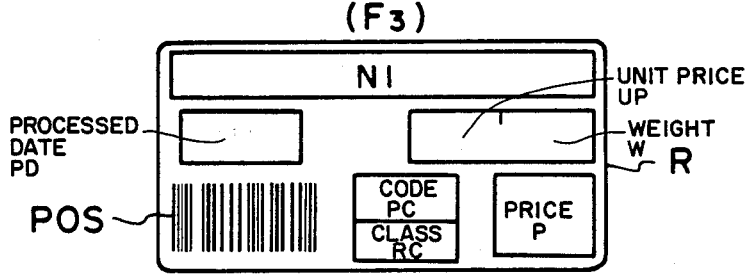
Figure 2A:
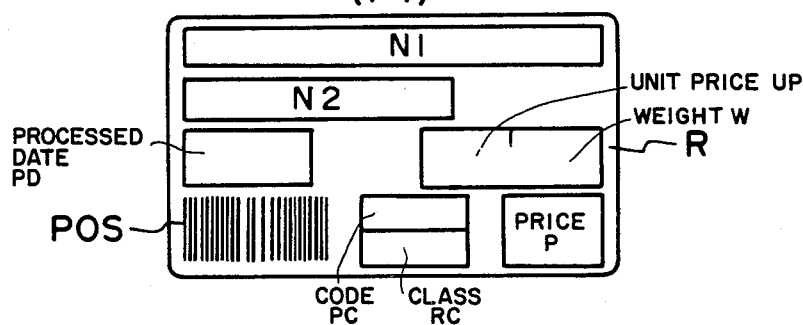
Figure 2B:
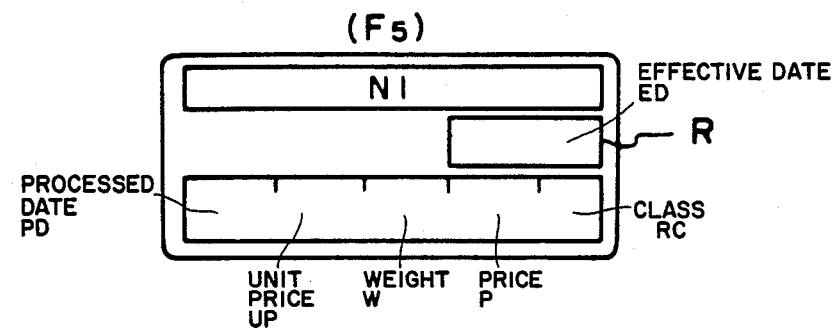
Figure 2B:
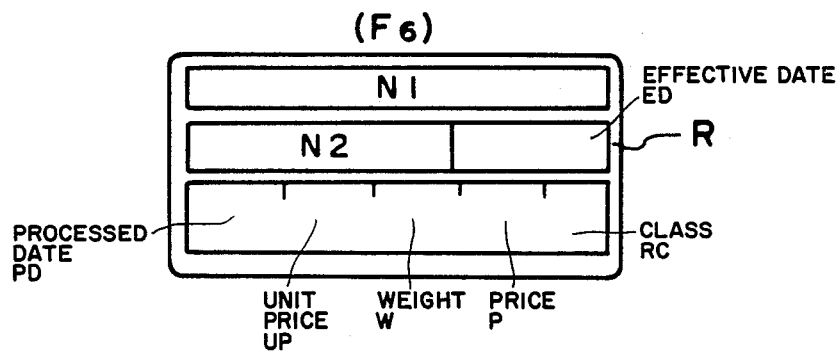
Figure 2B:
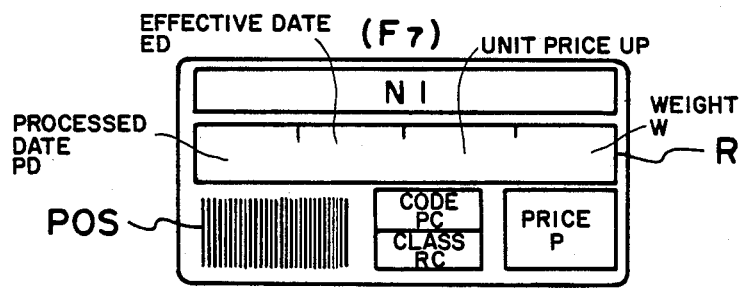
Figure 2B:
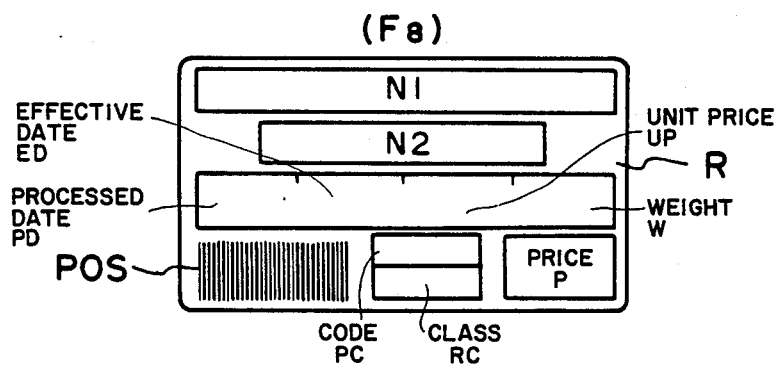

FIG. 1 is a view illustrating, in the form of a block diagram, the functions implemented by the hardware or software of a label printer according to the present invention, the printer being used in conjunction with an electronic scale. FIG. 2 is a plan view showing examples of label formats used by the electronic weigher.

In FIG. 1, an input unit 1 includes a numeric key group 11, a function key group 12 having such keys as a PRINT key, CALL key, PRODUCT CODE key, CLASS CODE key, DATE key and EFFECTIVE DATE key, and is adapted to specify whether a label is to be provided with such headings as the effective date, bar code and additive for a particular product, and to set information that is to be printed, such as the product name, description of the additive, product code, class code, processed date and effective date.

A memory device 2 is constituted by, e.g., a ROM (read-only memory) and stores programs corresponding to the label formats F1 through F8 of the type shown in FIG. 2. Each program controls the printing position and size of the data (numerals) to be printed in each of the printing sections provided on a label R, as well as the feed of the paper for that label.

In FIG. 2, N1 represents a product name section, N2 an additive identification section, PD a processed date section, UP a unit price section, W a weight section, P a price section, ED an effective date section, PC a product code section, RC a class code section, and POS a bar code section.

Returning to FIG. 1, reading means 3 decides a label format based on the combination of print items or headings entered by the numeric key group 11 or function key group 12 of the input unit 1, reads the program corresponding to the label format out of the memory device 2, and delivers the program to a printing mechanism 4.

Thus, in the present embodiment of the invention, if one specifies whether a label is to be provided with the three items of effective date ED, bar code POS and additive, then, based on the combination of designated items, the printer will decide the label format having these items and read the program corresponding to the decided format out of the memory device 2. Further, in the present embodiment, these three items can be designated by entering a three-digit binary code (ABC). For example, if a label is to be provided with an effective date section, then the most significant digit (A) of the binary code (ABC) is set to "1". If no effective date section is provided, then (A) is set to "0". If a label is to be provided with a bar code section, the second digit (B) of the binary code (ABC) is set to "1"; if not, (B) is set to "0". Likewise, if a label is to be provided with an additive identification section, the least significant digit (C) of the bar code (ABC) is set to "1"; if not, (C) is set to "0".

The following Table shows the various formats that can be designated by setting the binary code through use of the numeric key group 11.

TABLE

| Binary Code | Effective Date Section? | Bar Code Section? | Additive Section? | Designated Label Format |
| --- | --- | --- | --- | --- |
| 000 | No | No | No | F1 |
| 001 | No | No | Yes | F2 |
| 010 | No | Yes | No | F3 |
| 011 | No | Yes | Yes | F4 |
| 100 | Yes | No | No | F5 |
| 101 | Yes | No | Yes | F6 |
| 110 | Yes | Yes | No | F7 |
| 111 | Yes | Yes | Yes | F8 |

It should be noted that the formats F1 through F8 shown in the above Table correspond to the label formats F1 through F8 illustrated in FIG. 2.

The printing mechanism 4 in FIG. 1 comprises printing control means 41 and a printing unit 42 having a printing head and peripheral equipment such as a paper feeder. The printing head may be of the dot printer type utilizing a thermal head and is adapted to print labels having the plurality of formats shown in FIG. 2, the printing being carried out under the control of the particular program. Connected to the printing mechanism 4 are an electronic weigher 5 and a character generator 6. When data such as unit price, weight and price enter from the electronic weigher 5, the printing control means 41 reads character patterns corresponding to the data out of the character generator 6, reads the corresponding program out of the memory device 2 through the reading means 3, and controls the printing unit 42 based on the read program and character patterns so that prescribed characters and numerals will be printed on a label R at predetermined positions.

Also connected to the printing mechanism 4 is a second memory device 7 which stores the character codes of various product names, additives and the like. When a predetermined call code is entered at the input unit 1, the character code of a product corresponding to the output printing data from the electronic weigher 5, or a character code establishing correspondence between the product and the name of an additive, is read out of the second memory device 7 in synchronism with the output data from the electronic weigher, and is applied to the printing control means 41 as an input thereto. For example, if the characters for "sliced beef" are to be printed out as the product name, the operator uses the numeric key group 11 to enter a predetermined call code corresponding to the product name, and then presses the CALL key. This will cause the call code to be stored in an internal RAM (not shown) so that the code may be read out at an opportune time. If information such as the processed date or effective date is to be printed, the operator keys in the month, day and year successively using the numeric key group 11, and then presses the DATE key or EFFECTIVE DATE key. This causes the character code corresponding to the entered month, day and year to be stored in the above-mentioned RAM. If a product code or class code is to be printed, the operator keys in the corresponding code number using the numeric key group 11 and then presses the PRODUCT CALL key or CLASS CODE key, in response to which the character code corresponding to the corresponding code number is stored in the RAM, allowing the code to be read out in synchronism with the output of printing data from the electronic weigher 5.

Price data from the electronic weigher 5 and a product code entered at the input unit 1 are applied to a bar code converting unit 8 as inputs thereto. The unit 8 converts these items of data into bar codes and delivers a signal indicative thereof to the printing control means 41 of the printing mechanism 4.

The printing control means 41, which receives the foregoing character and bar codes as inputs thereto, reads the pattern corresponding to a character code out of the character generator 6 and, based on the particular program, controls the printing unit 42 to print the character pattern and bar code on a designated label at the predetermined positions.

The printing mechanism 4 having the foregoing functions is well-known in the art and a detailed description of its construction is therefore deleted. It should also be noted that such components as the reading means 3, the printing control means 41 of the printing mechanism 4 and the bar code converting unit 8 may be realized through microcomputer technology.

Figure 3:
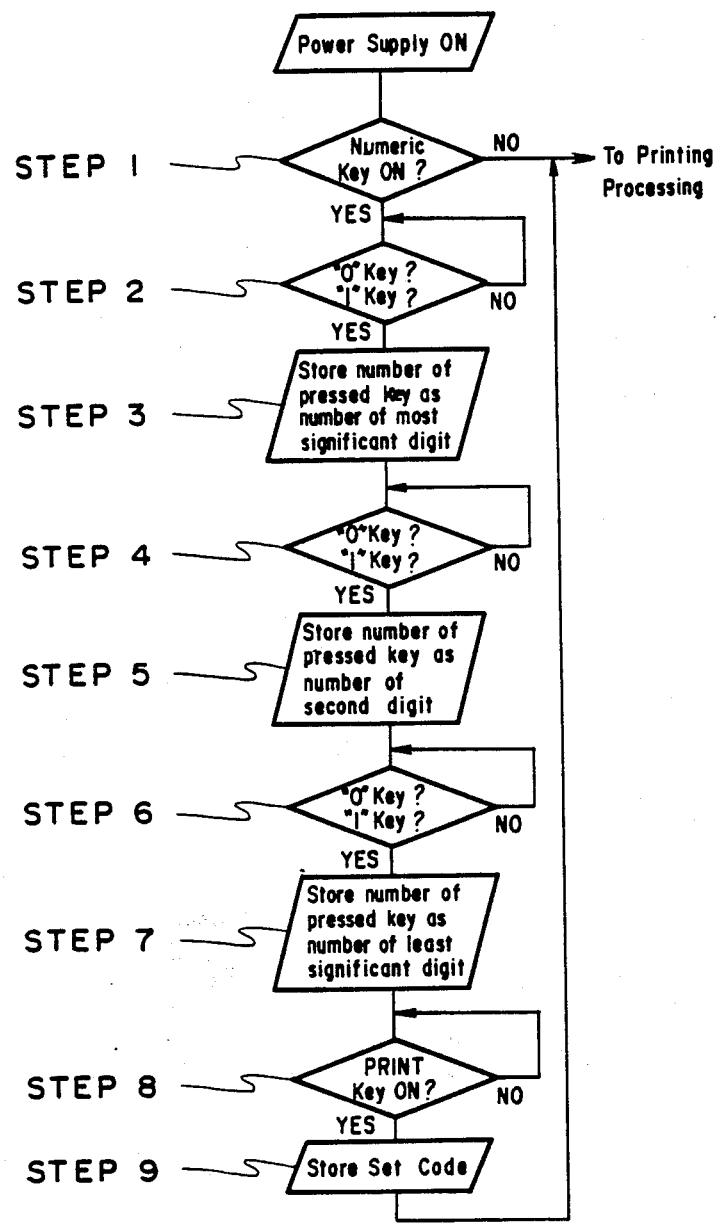
FIG. 3 is a flowchart of processing for designating label format.

FIG. 3 is an example of a flowchart showing the procedure for designating a label format as well as the operating sequence of the reading means 3. The label printer of the illustrated embodiment is not provided with a special-purpose key for initiating a format designation mode. Therefore, step 1 of the flowchart describes the operation which must be performed to establish this mode.

Step 1: After the introduction of electric power, it is determined whether a numeric key is in the "on" (depressed) state. If the result is negative, the operation shifts to the usual printing processing. If the result is affirmative, however, then the system enters the mode for designating a label format.

Step 2: When the label format designation mode has been established, it is determined whether the first key pressed is either the "0" key or "1" key. If the result is that neither of these keys has been pressed, the system enters a stand-by state until the "0" or "1" key is pressed.

Step 3: When either the "0" key or "1" key is pressed, the number of the pressed key is stored in memory as the most significant digit of the binary code.

Step 4: When the processing for step 3 ends, it is determined whether the second key pressed is either the "0" key or "1" key.

Step 5: If the decision rendered in step 4 is that the "0" key or "1" key has been pressed, then the number of the pressed key is stored in memory as the second digit of the binary code.

Step 6: When the processing for step 5 ends, it is determined whether the third key pressed is either the "0" key or the "1" key.

Step 7: If the decision rendered in step 6 is that the "0" key or "1" key has been pressed, then the number of the pressed key is stored in memory as the least significant digit of the binary code.

Step 8: When the processing for step 7 ends, the system enters the stand-by state until the PRINT key is pressed. When the PRINT key is pressed, the completes the setting of the three-digit binary code and moves processing to the next step.

Step 9: Here the three-digit binary code set by the previous processing is stored in the internal RAM (not shown), which has a back-up power supply and is adapted to hold the code in a non-volatile manner. The binary code stored in this fashion is held until the next change in label format.

With the completion of the label format designation and the application of the printing data to the printing control means 41, the reading means 3 reads out the program corresponding to the stored binary code and delivers the program to the printing control means 41.

In the illustrated embodiment, a label format is designated by using the numeric key group 11. Alternatively, however, the input unit 1 may be provided with special-purpose keys corresponding to the foregoing three items, and a binary code may be entered by the ON ("1")-OFF ("0") combination of these keys. Further, a special-purpose key may be provided for each label format so that the format desired to be used may be designated directly. Or, in another possible arrangement, call codes corresponding to the various label formats may be stored in a memory device beforehand. Then, by entering the call code from the input unit 1, the program corresponding to the particular label format may be read out of the memory device 2.

It should be noted that the label formats capable of being designated are not limited to the eight varieties shown in FIG. 2. The number of label format varieties may be increased or decreased as required.

In accordance with the label printer of the present invention, a plurality of programs for controlling the positions at which data are to be printed on a label are stored in memory beforehand, with each program corresponding to a particular label format. Using an input unit, the operator designates the desired label format, in response to which the corresponding program is read out of the memory. A dot-type printing mechanism is controlled based on the read program. Accordingly, it is possible for a single label printer to employ labels having a variety of different formats, so that it is unnecessary to provide a label printer for each variety of label format.

Reference will now be had to FIGS. 4 through 8 to describe a case where the present invention is applied to a journal printer arranged to operate in conjunction with a plurality of electronic weighers serving as sources of data and having different printing formats.

Figure 4:
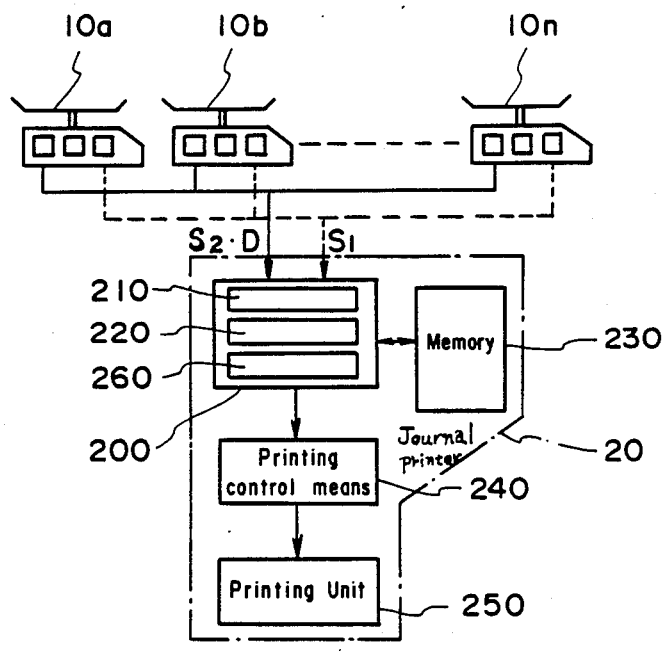
FIG. 4 is a block diagram showing the general features of a journal printer according to the present invention.

FIG. 4 is a view illustrating, in the form of a block diagram, the functions implemented by the hardware or software of a journal printer according to the present invention.

Figure 5:
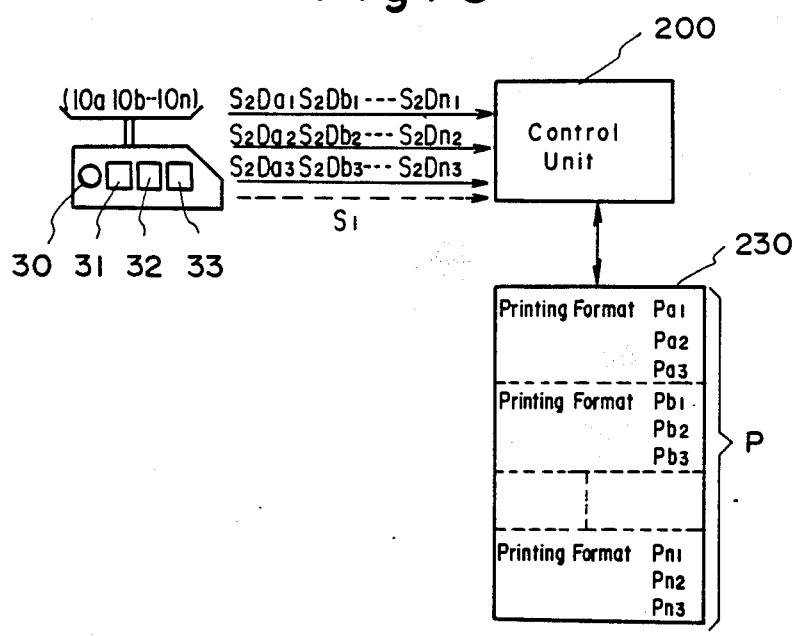
FIG. 5 is a view illustrating the configuration of data produced as an output by an electronic weigher, as well as the contents of a memory device storing a printing format.

In FIG. 4, numerals $10a$, $10b$, . . . $10n$ designate a plurality of electronic weighers having different printing formats. Numeral 20 denotes the journal printer according to the present invention. Each of the electronic weighers $10a$, $10b$, . . . $10n$ is adapted to provide the journal printer 20 with a weigher identification signal S1 peculiar to the particular electronic weigher, a mode signal S2 described hereinbelow, and printing data D. As shown in FIG. 5, the printing data D includes data for a registration mode, namely items of data $Da_1$, $Db_1$, . . . $Dn_1$ indicative of registered product codes, unit prices, effective periods and the like; data for a totalization mode, namely items of data $Da_2$, $Db_2$, . . . $Dn_2$ indicative of prices and weights received from each weighing operation for the purpose of being totaled; and data for a label printing mode, namely items of data (product code, unit price, price, etc.) $Da_3$, $Db_3$, . . . $Dn_3$ to be printed by a label printer with each weighing operation. Delivered as an output at the beginning of each item of data is the mode signal S2 indicating the mode of the data. The weigher identification signal S1 is produced as an output by pressing a print key 30. The mode signal S2 and the printing data D are produced as outputs by pressing mode selection keys 31, 32, 33 corresponding to the registration, totalization and label printing modes.

The journal printer 20 includes a control unit 200 comprising weigher discrimination means 210, mode discrimination means 220 and reading means 260, as well as a memory device 230, described hereinbelow, which stores a printing format decided by the type of weigher and mode. As shown in FIG. 5, printing formats $Pa_1$, . . . $Pn_1$, $Pa_2$, . . . $Pn_2$, $Pa_3$, . . . $Pn_3$ are stored beforehand in the memory device 230 in correspondence with the items of mode data $Da_1$, . . . $Dn_1$, $Da_2$, . . . $Dn_2$, $Da_3$, . . . $Dn_3$ for registration, totalization and label printing, received from the electronic weighers $10a$, $10b$, . . . $10n$. The journal printer 20 relies upon the weigher discrimination means 210 to discriminate, based on the weigher identification signal S1 from each of the electronic weighers, which of the electronic weighers $10a$, $10b$, . . . $10n$ is providing data, and relies upon the mode discrimination means 220 to discriminate, based on the mode signal S2, the mode of the data received. In accordance with the results of the discrimination operations performed by these discrimination means 210, 220, the reading means 260 reads the corresponding printing format out of the memory device 230 so that the data D will be printed out in this format.

Numeral 240 in FIG. 4 denotes a printing control means, and number 250 represents a printing unit including a printing head and auxiliary equipment such as a paper feed mechanism.

Figure 6:
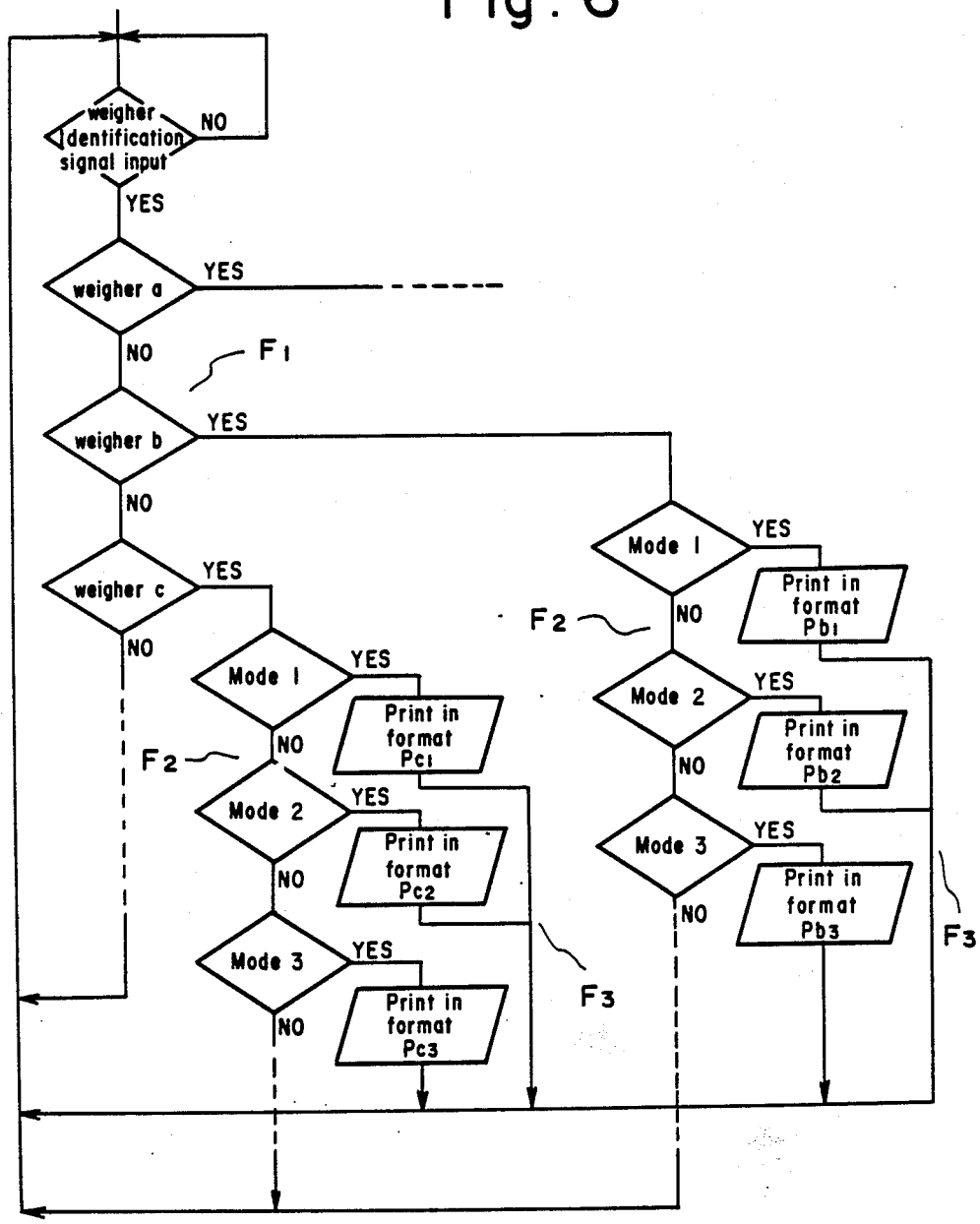
FIG. 6 is a flowchart of processing executed by a central processor in a case where the central processor is employed as a control unit.

FIG. 6 is a flowchart of processing executed by a central processor (CPU) in a case where the CPU is employed as the control unit 200 comprising the weigher discrimination means 210, mode discrimination means 220 and reading means 260.

In branch F1 of the flowchart, a weigher identification signal S1 produced by an electronic weigher is read by the weigher discrimination means 210, which then proceeds to discriminate the particular weigher that is transmitting the mode signal S2 and printing data D. Next, in F2, the mode discrimination means 220 reads the mode signal S2 to discriminate the mode of the data being received. In F3, the reading means 260, in accordance with the results of the discrimination operation, reads the corresponding printing format out of the memory device 230 and delivers the printing format and the received data to the printing control unit 240. The latter controls the printing unit 250 to print the data on a sheet of journal paper in accordance with the printing format. For example, in a case where totalizing mode data $Da_2$ from the electronic weigher $1a$ is to be printed, the printing format $Pa_2$ is read out of the memory device 230.

Figure 7:
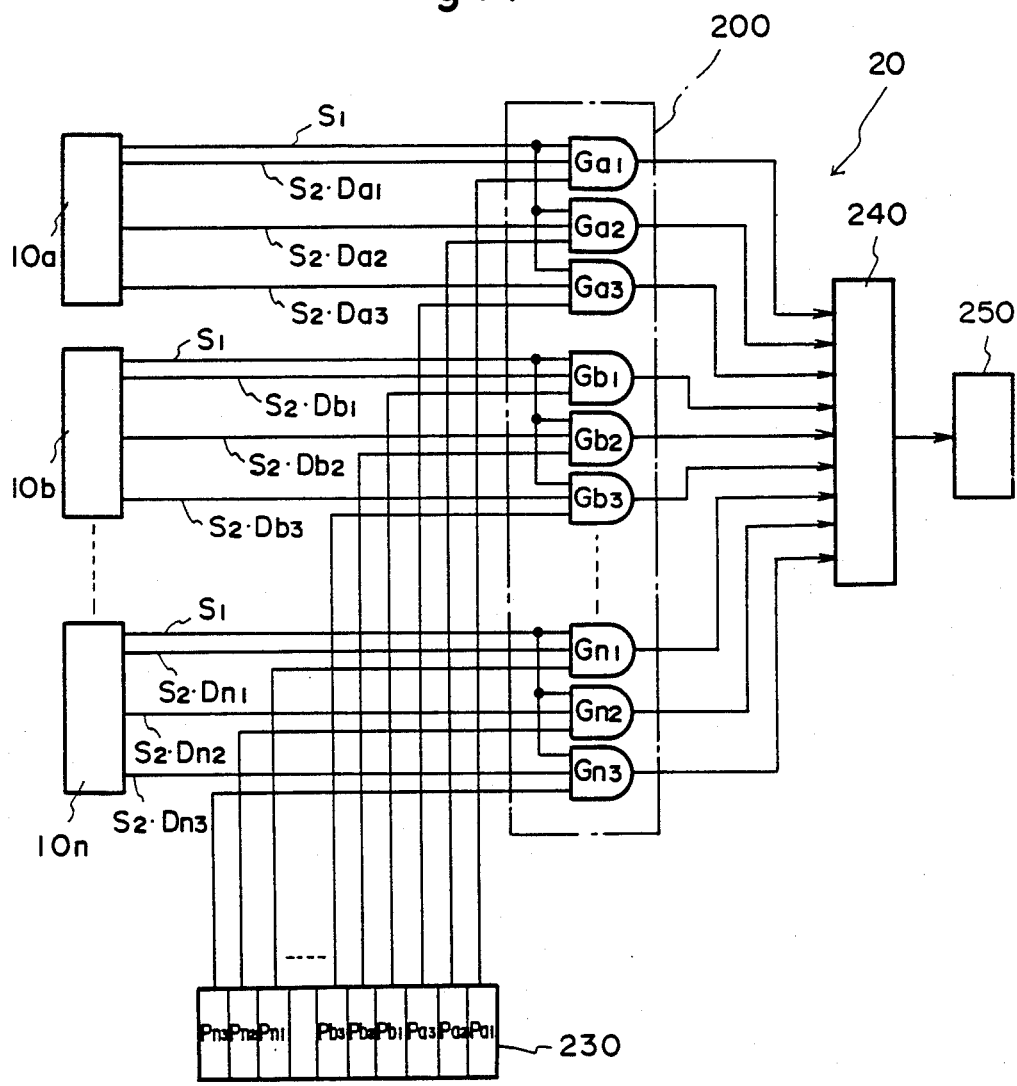
FIG. 7 is a block diagram in a case where hardware is employed as a control unit.

FIG. 7 illustrates an embodiment wherein the control unit 200 is realized through the use of hardware. The control unit 200 comprises AND gates $Ga_1$, $Ga_2$, ... $Ga_n$, $Gn_2$, $Gn_3$. These AND gates serve as the weigher discrimination means, mode discrimination means and reading means. In FIG. 7, the inputs to the AND gate $Ga_1$ are the weigher discrimination signal S1, mode signal S2 and data $Da_1$ from the electronic weigher $10a$, as well as the printing format $Pa_1$ from the memory device 230. The inputs to the AND gate $Ga_2$ are the weigher discrimination signal S1, mode signal S2 and data $Da_2$ from the electronic weigher $10a$, as well as the printing format $Pa_2$ from the memory device 230. The inputs to the AND gate $Ga_3$ are the weigher discrimination signal S1, mode signal S2 and data $Da_3$ from the electronic weigher $10a$, as well as the printing format $Pa_3$ from the memory device 230. Likewise, the AND gates $Gb_1$, $Gb_2$, $Gb_3$ receive signals and data from the electronic weigher $10b$ and printing formats from the memory device 230, and the AND gates $Gn_1$, $Gn_2$, $Gn_3$ receives signals and data from the electronic weigher $10n$ and printing formats from the memory device 230.

By way of example, when the electronic weigher $10b$ produces the mode signal S2, data $Db_2$ and weigher discrimination signal S1 as outputs, the AND gate $Gb_2$ opens to supply the printing control means 240 with the data $Db_2$ from the weigher $10b$ and with the printing format $Pb_2$ from the memory device 230. As a result, the data $Db_2$ is printed out in the printing format $Pb_2$.

Figure 8A:
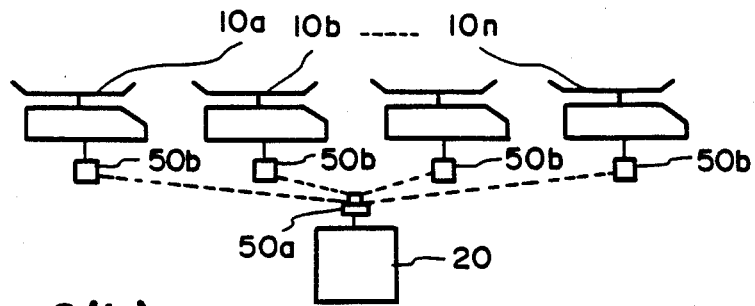
FIGS. 8(a) to 8(c) is a view illustrating the connections between a plurality of electronic weighers and a single journal printer.
Figure 8B:
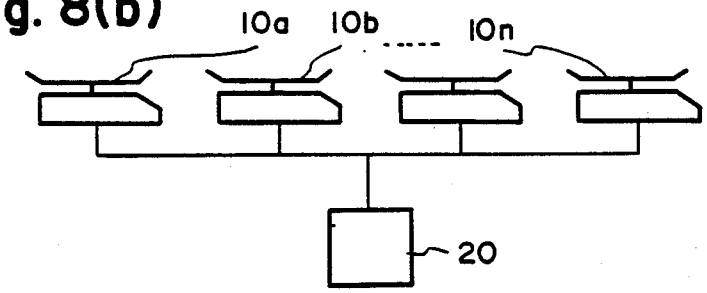
Figure 8C:
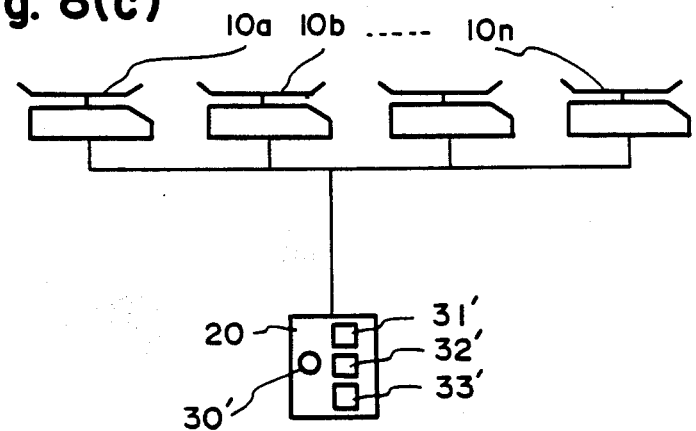

FIGS. 8(a) to 8(c) show examples of means for connecting the electronic weighers $10a$, $10b$, ... $10n$ with the journal printer 20. In the arrangement of FIG. 8(a), connectors $50a$, $50b$ are used to detachably interconnect the electronic weighers with the journal printer, with the connection to a different weigher being effected whenever printing associated with one weigher is completed. This arrangement is useful in cases where a single journal printer is moved to a plurality of electronic weighers employed at a remote location. FIG. 8(b) shows a more systematic configuration in which a plurality of electronic weighers $10a$, $10b$, ... $10n$ are connected to the journal printer 20 at all times. The arrangement of FIG. 8(c) is similar to that of FIG. 8(b) in that the electronic weighers and journal printer are interconnected at all times. In this case, however, a printing key 30' and mode selection keys 31', 32', 33', which correspond to each of the electronic weighers, are provided on the journal printer side. Pressing the printing key 30' calls a specific electronic weigher and sets the weigher discrimination means 210 into operation. Pressing the mode selection keys 31', 32', 33' effects a mode selection and sets the mode discrimination means 220 into operation. Thus, merely performing an operation on the journal printer side enables one to print out data of the desired mode from the desired electronic weigher in the corresponding printing format.

In accordance with the journal printer of the present invention, various kinds of data from a plurality of electronic weighers having different printing formats can be printed out in a desired printing format by a single journal printer. This enhances economy and the degree of freedom of both the electronic weighers and the journal printer.

As many apparently widely different embodiments of the present invention can be made without departing from the spirit and scope thereof, it is to be understood that the invention is not limited to the specific embodiments thereof except as defined in the appended claims.

What we claim is:

1. A journal printer for printing data received from a plurality of electronic weighers in a selected one of a plurality of different printing formats, comprising:
   memory means for storing a plurality of printing formats;
   weigher discrimination means for discriminating from which of the plurality of electronic weighers data is received;
   mode discrimination means for discriminating whether said data is of a registration, totalizing or label printing mode, each mode having a corresponding printing format;
   reading means for reading the printing format out of said memory device in accordance with the results of said discrimination performed by said weigher discrimination means and said mode discrimination means; and printing means for printing out said data in the printing format read out of said memory device.

2. A journal printing system including the journal printer according to claim 1, said system comprising:
   said plurality of electronic weighers;
   means, provided on each of said electronic weighers, for operating said weigher discrimination means; and
   a mode selection key provided on each of said electronic weighers for operating said mode discrimination means.

3. The journal printer according to claim 1, further comprising:
   means for operating said weighter discrimination means; and
   a mode selection key for operating said mode discrimination means.

* * * * *